Figure 1:
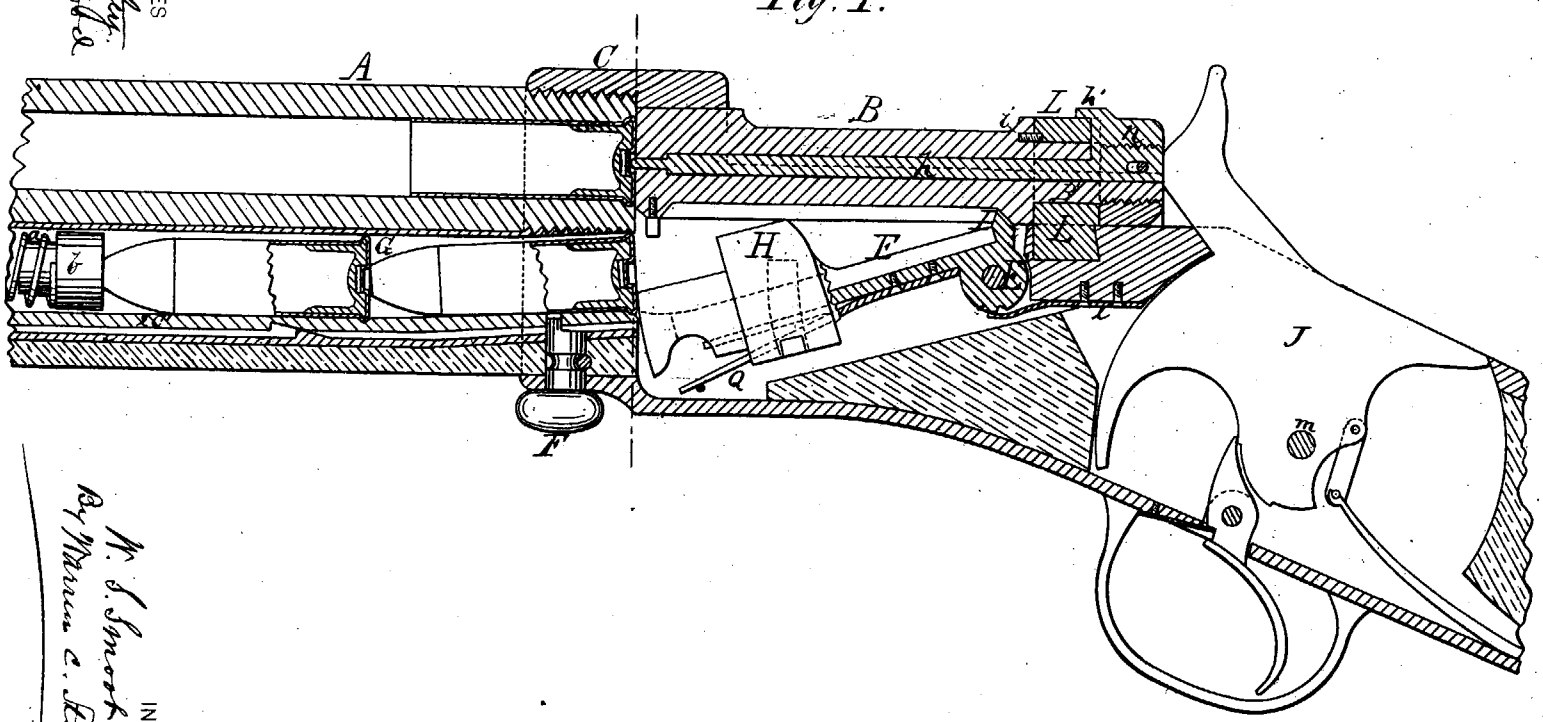

2 Sheets—Sheet 1.

W. S. SMOOT.

MAGAZINE FIRE-ARMS.

No. 7,827. Reissued July 31, 1877.

WITNESSES

M. P. Utley.

Arthur B. Wood

INVENTOR

W. S. Smoot

By Warren C. Stone

ATTORNEY

N. PETERS, PHOTO-LITHOGRAPHER, WASHINGTON, D. C.

2 Sheets—Sheet 2.
W. S. SMOOT.
MAGAZINE FIRE-ARMS.
No. 7,827. Reissued July 31, 1877.
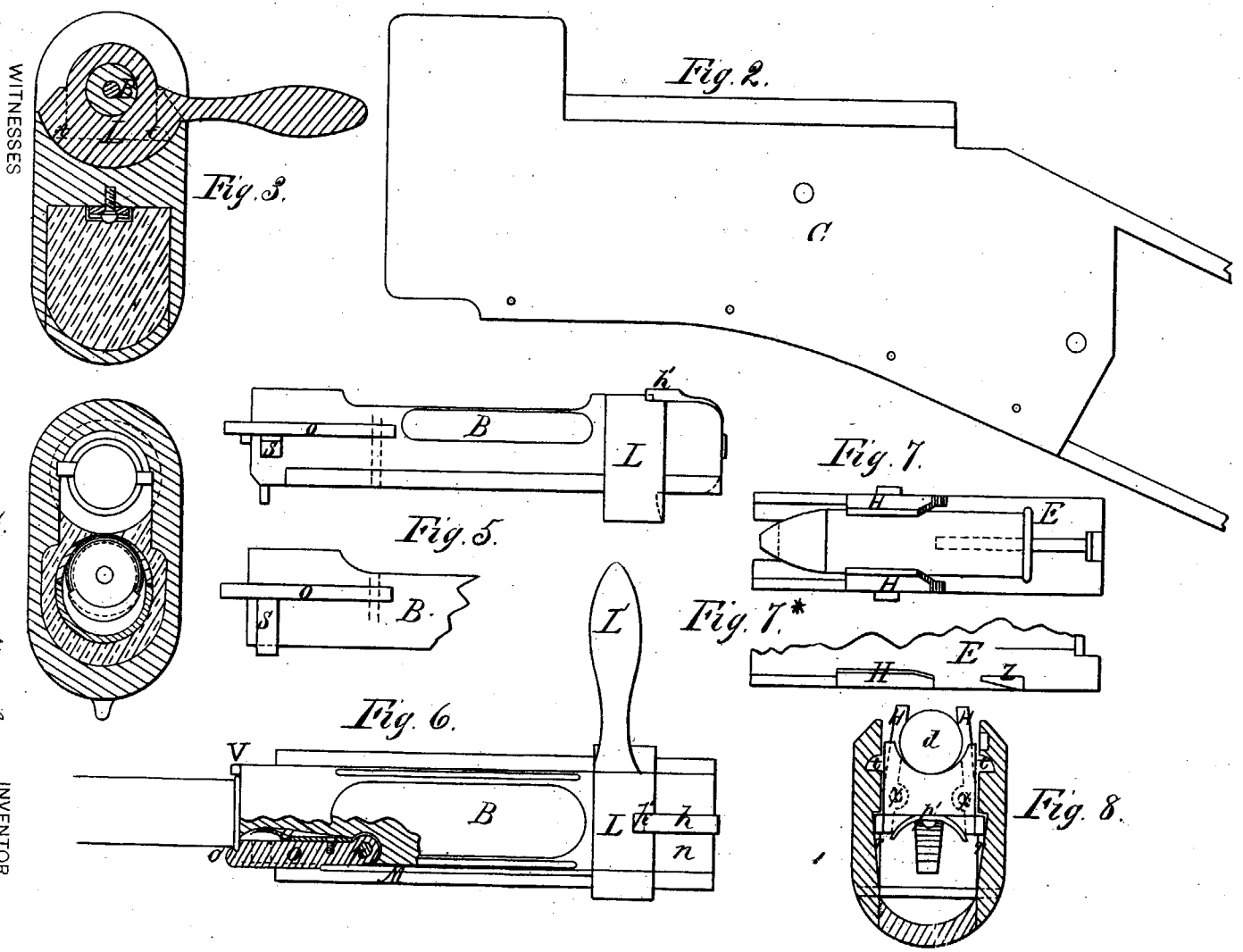
WITNESSES
M. F. Utley.
Arthur B. Wood
INVENTOR
W. S. Smoot
By Warren C. Stone
ATTORNEY
N. PETERS, PHOTO-LITHOGRAPHER, WASHINGTON, D. C.

UNITED STATES PATENT OFFICE.

WILLIAM S. SMOOT, OF ILION, NEW YORK.

IMPROVEMENT IN MAGAZINE FIRE-ARMS.

Specification forming part of Letters Patent No. 97,821, dated December 14, 1869; Reissue No. 7,827, dated July 31, 1877; application filed January 26, 1877.

DIVISION A.

*To all whom it may concern:*

Be it known that I, WILLIAM SYDNEY SMOOT, now of Ilion, Herkimer county, in the State of New York, formerly of Washington, D. C., have made and invented certain new and useful Improvements in Repeating Fire-Arms, of which the following is a full and exact description, reference being had to the accompanying drawings, forming a part of this specification, in which—

Figure 1 is a longitudinal section. Fig. 2 is an exterior view of the receiver. Fig 3 is a transverse section through the locking-key; Fig. 4, a transverse section in rear of the chamber. Figs. 5 and 6 are side and plan views of the breech block or bolt. Figs. 7 and 8 are plan and front views of the cartridge-carrier and retaining-fingers. Fig. 7* is a modification of the carrier, showing a projection, Z, for clearing the extractor from the cartridge-flange.

A represents the barrel, which may be of any convenient size or caliber, and is screwed into a receiver or breech-housing, C.

The breech-block B slides back and forth on top of the receiver, and is held in place by ribs *t t*, which slide in grooves in the upper portion of the receiver. The breech-block B is supported against the recoil by an annular eccentric key, L, mounted on a cylindrical offset or stem, B′, on the rear portion of the breech-block, and held in place by ferrule *n*, which screws on the said stem in rear of the key, and is further secured by a set-screw or pin. This ferrule *n* is given the same exterior shape as the body of the breech-plug. The eccentric key L is capable of a vibratory movement upon the stem B′, so as to pass into or out of the slot or groove in the receiver, for the purpose of locking or unlocking the breech. The shape of this key is peculiar, being under-cut, as shown in Fig. 1, to resist any upward component of the recoil that may result from a yielding of the metal of the breech, and wedge-shaped in the direction of its angular movement, to close the breech firmly against the barrel. A stud, *i*, and groove in the front edge of the key limit the amount of angular movement of the latter. The firing-pin or plunger *h* passes through the center of the breech or recoil-block B, and communicates the blow of the hammer J to the cartridge.

A head on the rear end of the firing-pin passes up through a slot in the recoil-block, and enters an oblique-sided notch in the locking-key, (see dotted line, Fig. 6,) so that the act of unlocking the breech forces back the firing-pin out of contact with the cartridge, and sets the hammer at half-cock. A lip, *h′*, extending forward, covers the space between the firing-pin and key, to prevent the entrance of dirt.

The hammer J is pivoted at *m* to the sides of the receiver, and is half-cocked, as just described, by the act of unlocking the breech, and full-cocked in the act of withdrawing the breech to its loading position. The arrangement of the trigger, mainspring, &c., does not differ from that now in use.

The magazine-tube G is placed under the barrel, and may be covered by the stock. Its rear end is let into the receiver and inclined upward to facilitate the passage of the cartridges into the carrier.

In the bottom of the magazine is a sliding rod, 2 C′, moved back and forth by the eccentric stud F, and having its under side formed into a series of ratchets corresponding in number and position with the oblique-faced studs on the lower side of the magazine-tube.

The cartridges are fed to the rear into the carrier E by a spiral spring, *a*. This spring is provided with a guiding-plunger, *b*, at its rear end.

In fabricating this magazine-tube I prefer making it in halves, divided longitudinally, and with a slot between the two pieces, in which slot slides a stud on the plunger *b*, said stud and slot performing the function of guiding and limiting the movement of the plunger. In cross-section this tube is elliptical, with a vertical major axis, so as to allow space for the rod C without unnecessarily increasing the bulk of the magazine.

The carrier E is pivoted to the sides of the receiver at E′, above the center of the magazine, so that when in its lower position it shall form an incline, up which the cartridges may be forced by the spiral feeding-spring, and is capable of a limited vibration upon its pivot, so as to lift the cartridge into line with the barrel.

An arm, I, extends from the upper side of the carrier-block, and engages with a shoulder at the front end of the slot in the under side of the breech-block when the latter is withdrawn, so as to obtain the necessary vibration of the carrier from the backward movement of the breech.

A spring, Q, is attached to the under side of the carrier, and bears against a shoulder on the receiver, to hold the carrier in such position relatively to the magazine that the passage of cartridges therefrom is prevented, except when the carrier is forced down by the breech-plug.

The cartridges which I propose using in this gun are formed with a depression in the base, at the bottom of which depression is the priming. The bullets are truncated, so as to fit over the sides of this recess, and be thus prevented from resting against the priming.

On either side of the carrier-block are lever-catches H, pivoted at *x*, and pressed together by springs *p'*, so as to grasp the cartridge while in the carrier, and prevent its accidental expulsion.

Inclines *r r* are formed on the sides of the receiver, and operate, in connection with the lever-catches H, to hold the latter in such position as to permit the free passage backward of the cartridge while the carrier is in its lower position, but allow the said lever-catches to grasp the cartridge in any other position of the carrier. These catches may be arranged to control the passage of cartridges from the magazine by forming them in such manner that their extreme front ends shall project inward farther than the other portion, so that the flange of the rearmost of the cartridges in the magazine may rest against the front ends of these catches at the same time that the cartridge in the carrier passes freely.

The cartridge-retractor, which I have designed to operate, in connection with my sliding breech, consists of a lever-catch, O, pivoted to the breech at *p*, formed with a tooth that bears against the side of the receiver, and holds the hook O' firmly against the side of the case.

A groove is formed in the side of the receiver at M, to permit the retractor to disengage itself from the cartridge-shell and embrace the flange of that next inserted.

A stud, V, is formed on the face of the breech-plug opposite the cartridge-retractor, and the flange of the shell is held firmly between it and the front end of the lever O.

Both the retractor and stud are placed above the center of the barrel, to hold the shell down until its front end is removed from the chamber.

A spring, *u*, is placed under the lever O to disengage it from the shell, when permitted by the groove M in the side of the receiver.

In place of the arrangement just described for disengaging the lever O from the cartridge after the removal of the latter, the device shown in Figs. 5 and 7* may be used. This differs from the above only in the employment of an oblique-faced stud, Z, on the carrier-block, to act in connection with the tooth S for the purpose of freeing the lever-catch O from the cartridge-case toward the end of the backward movement of the breech.

Operation of the arm: To load, revolve the locking-key L upon its center by means of the handle L'. This withdraws the point of the firing-pin from contact with the cartridge-priming by means of the oblique-sided notch in the upper portion of the key, acting in connection with the stud on the head of the pin at the same time that it disengages the key from its seat in the receiver. Draw back the sliding breech-plug, and pass the cartridges into the rear of the magazine over the top of the vibrating carrier. After the insertion of each cartridge the carrier holds it in the magazine, as explained. Then close the breech. On again pulling back the breech-plug the rear cartridge in the magazine, which has been allowed to pass into the carrier by the depression of the latter consequent upon the closing of the breech, passes up the inclined carrier-block, and by a continuation of the backward movement of the breech, which vibrates the carrier upon its pivot E', is lifted into line with the barrel. The same backward movement of the breech cocks the hammer. The closing of the breech forces the cartridge into the chamber. On again unlocking and withdrawing the breech, after the discharge of the arm, the same operation of the various parts obtains, with the exception that, as the exploded case is withdrawn by the lever-catch, the succeeding cartridge cannot pass all the way into the carrier until the flange end of the preceding cartridge-case is freed from the retractor, when the entering cartridge is thrown forcibly up the incline with sufficient power to eject the exploded case from the receiver. The rearward movement of the cartridges in the magazine is effected by the spiral feeding-spring.

To use the arm as a single loader, the button F is turned so as to move forward the slide 2 C', by which the several cartridges are firmly held in their respective positions.

I know that previous to my invention guns have been made with reciprocating breech-plugs sliding in a receiver in rear of the barrel, and locked in a variety of ways; but I am not aware that any gun has ever been made with a breech sliding in grooves on top of the receiver, and locked against the recoil by an annular eccentric key, as in my invention.

I also know that the cartridge-magazines of repeating fire-arms have been arranged to hold the cartridges separate from each other, as in the invention of V. Fogarty, patented in 1865.

In the case referred to the magazine is divided longitudinally, and the two parts, which are movable with respect to each other, are held together by a spring-clip.

The cartridges rest in oblique-sided grooves in the magazine-walls, and are kept apart only by the pressure of the spring closing the two halves of the magazine together.

In my invention the magazine is rigidly attached to the barrel and receiver, and no part is movable except the sliding rod 2 C′, which is actuated by the turn-button F, to wedge the several cartridges against the side of the magazine by a positive movement of the rod and eccentric stud.

I also know that cartridge-retractors have been made to lock positively against the flange of the case, as in the invention of C. B. Richards, patented August 18, 1868, and this, broadly, as well as the other devices above mentioned as being old, I disclaim.

What I claim as my invention, and desire to secure by Letters Patent of the United States, is—

1. The combination of an annular key or eccentric sleeve, L, vibrating upon the exterior of the breech-block, with the continuous solid breech-block B, having feathers *t t*, the whole forming a breech system reciprocating upon the top of the frame, and available throughout its entire length for the reception of a mainspring and guiding-flange or feather.

2. The combination of the spring Q with the carrier-block E and a magazine-tube, G, loaded from above and in rear, the whole being arranged in such manner that after the insertion of each cartridge into the magazine the carrier shall be caused to partially cover the mouth or entrance thereof to prevent the expulsion of the cartridge.

3. The retaining-fingers H, in combination with pivoted carrier-block E and inclines *r r* on the sides of the breech-frame, the whole operating substantially as and for the purpose set forth.

4. The combination of the annular key, having an oblique-sided notch, and the firing-pin *h*, whereby the latter is withdrawn upon the rotation of the former to unlock the breech, as herein specified.

WILLIAM S. SMQOT.

Witnesses:
E. ROCHE,
H. H. BENEDICT.